Feb. 1, 1966 W. SPYRA ETAL 3,233,142
TELEVISION DEFLECTION CIRCUIT INCLUDING MEANS
FOR DERIVING UNDISTORTED FLYBACK PULSES
Filed March 15, 1962

INVENTOR
WALTER SPYRA
WALTER OTTEN
BY
AGENT 3,233,142
Patented Feb. 1, 1966

3,233,142

TELEVISION DEFLECTION CIRCUIT INCLUDING MEANS FOR DERIVING UNDISTORTED FLY-BACK PULSES

Walter Spyra, Hamburg-Lokstedt, and Walter Otten, Hamburg, Germany, assignors to North American Philips Company, Inc., New York, N.Y., a corporation of Delaware Filed Mar. 15, 1962, Ser. No. 179,891
Claims priority, application Germany, Apr. 14, 1961, P 26,968
12 Claims. (Cl. 315—27)

Figures 1, 3:
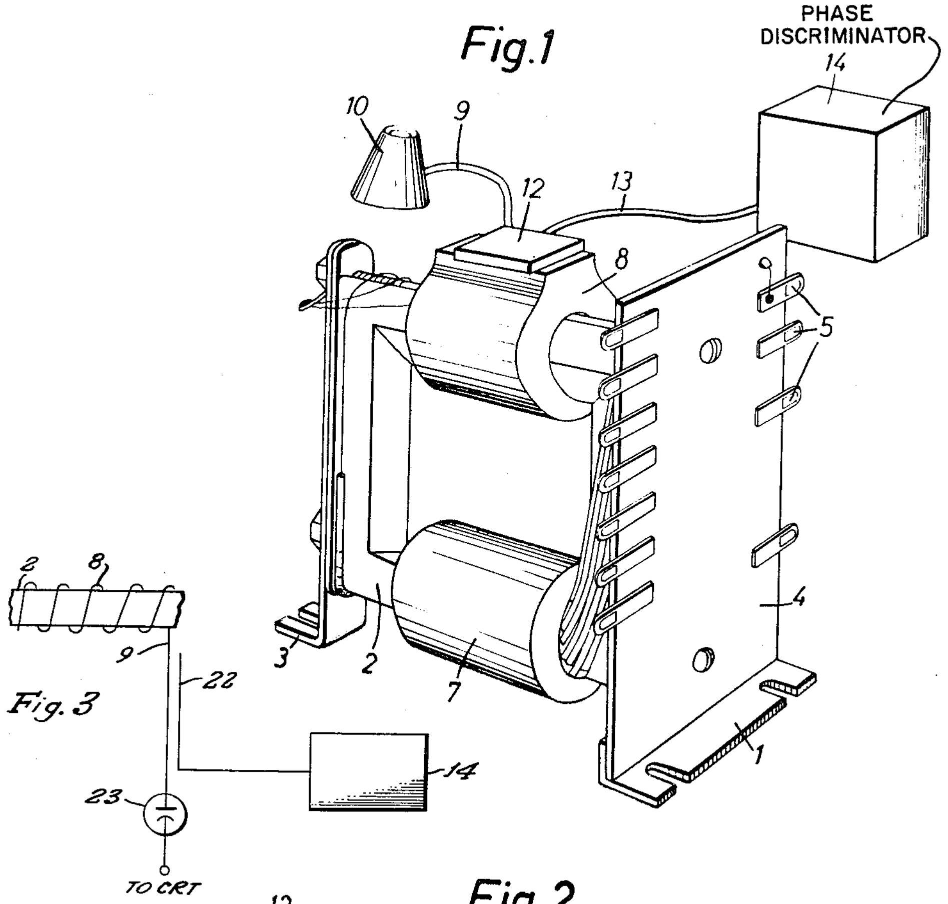

The invention relates to a television receiver of the type comprising a deflection circuit including a transformer having a value of leakage inductance such that both at the beginning and at the end of the fly-back period the current across the leakage inductance and the derivative of this current are substantially zero. More particularly, the invention concerns apparatus by which fly-back oscillation pulses can be derived from the transformer with a minimum of distortion.

If the leakage inductance of the transformer is designed so that both at the beginning and at the end of the fly-back the current across the leakage inductance and the derivative of this current are zero, this condition ensures that during the forward stroke of the deflection current interference oscillations do not occur across the deflection circuit but, during fly-back, other interference oscillations occur. However, the latter interference oscillations, because of their occurrence during the fly-back, do not interfere with the reproduction of the television picture. The frequency of these interference oscillations appear to be about equal to a harmonic of the fly-back oscillation. Since the interference oscillations have a considerable amplitude, a significant distortion of the fly-back pulses occurs. The interference oscillations in the primary or occurring in another winding separated from the secondary are positioned relative to the fundamental fly-back oscillation such that a considerable dip of the resultant fly-back pulses occurs. This is undesirable, particularly in those cases in which the fly-back pulses are supplied to a phase comparison stage of the receiver. Distortion of the fly-back pulse is particularly troublesome in cases where the pulse must be differentiated. As is known a fly-back pulse itself approximately corresponds to a sine half wave oscillation. By differentiating a pure sine half wave, a cosine half wave is obtained which has a substantially linear edge in the proximity of the zero passage of the waveform. However, in the presence of interference oscillations, it appears that the differentiated curve has strong amplitude variations (bumps) in the proximity of the zero passage, and, in particular, may also vary the sign of its inclination. Such a distorted edge is not suitable to guarantee satisfactory operation of a phase discriminator. One prior art solution to this problem is disclosed in U.S. Patent 2,907,825 in the name of P. J. H. Janssen, and utilizes a tertiary winding on the output transformer.

These drawbacks are avoided and readily usable fly-back pulses are obtained, also in the presence of the said interference oscillations if, according to the invention, the fly-back pulses are derived from the secondary winding of the transformer via a small coupling capacitance.

The invention is based on the recognition of the fact that although an unfavourable phase relationship between the fly-back pulses and the interference oscillations occurs on the primary side of the transformer, in the secondary, the stray inductance of which contributes considerably to the creation of the interference oscillations, the phase relationship is such that no disturbing distortion of the fly-back pulses occurs and that there the pulse may be obtained simply by capacitive tapping.

Figure 2:
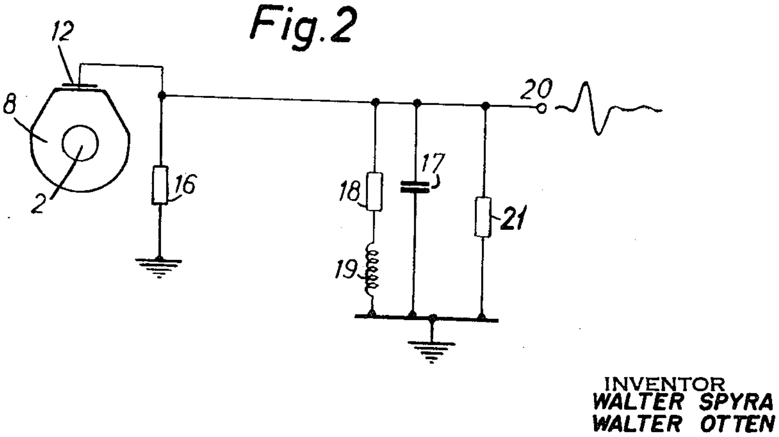

In order that the invention may readily be carried into effect, one embodiment thereof will now be described more fully, by way of example, with reference to the accompanying drawings, in which:

FIGURE 1 shows a line deflection transformer of a television receiver according to the invention, FIGURE 2 shows a circuit with which the fly-back pulse can be derived substantially without distortion and can consequently be made readily suitable for use in a phase comparison circuit, and FIGURE 3 illustrates another embodiment of the invention.

In FIGURE 1, a ferrite core 2 is provided on a holding angle 1 and supported on its other side by a second holding angle 3. The holding angle 1 supports an insulating plate 4 comprising soldering tabs 5 for establishing the connections to the windings of the transformer.

On the ferrite core 2, a primary winding 7 is provided. The connections of winding 7 and possible tappings are connected to the desired soldering tabs on the insulating plate 4. On the other limb of the ferrite core 2 a high voltage secondary 8 is provided, the connection 9 of which can be connected through a cap 10 to the anode of a high voltage rectifier tube or the like, not shown.

To avoid interference oscillations during the forward stroke of the deflection current and to improve the high voltage amplitude, the network comprising the windings 7 and 8 and the stray inductance operative between them as well as the capacitances which are operative primarily and secondarily, is tuned to the fundamental oscillation of the fly-back of the sawtooth current produced in the deflection apparatus and in addition to a frequency which is about equal to a harmonic of the fly-back oscillation, as is described in United States Letters Patent 2,805,384 issued to P. J. H. Janssen on September 3, 1957.

On a boundary surface of the high voltage winding 8 which preferably is flat, an output electrode 12 is provided according to the invention which is shaped correspondingly, at least substantially. This electrode is connected through a line 13 to the part 14 of the apparatus to be connected, for example, the phase discriminator stage.

It is of advantage, in particular if high voltages occur at the secondary 8, to enclose the output electrode 12 with insulating material, for example, with a readily insulating synthetic material, preferably a moulding resin. The insulating layer is preferably 0.5 to 2 mm. thick and closely surrounds the electrode and the adjacent part of the line 13 without fissures or cracks so as to avoid air occlusions which may result in glow phenomena in the vicinity of high voltages.

Referring now to FIG. 3, as the output electrode, a conductor 22 may also be used which extends in parallel with at least part of the length of the line 9 connected between the secondary winding 8 and the secondary load comprising a high voltage rectifier 23. This conductor may also enclose the line 9 as is known in the case of shielded wires or of dissymmetrical cables. Conductors 22 and 9 form the plates of the coupling capacitor. As in the first embodiment, conductor 22 couples the flyback pulse to the input of phase comparison stage 14. The input of phase comparison stage 14 may include suitable frequency selective circuitry for modifying and differentiating the flyback pulse, for example, as shown in FIG. 2.

At the output electrode 12, a voltage occurs which has a peak with even edges, which is very suitable for further use, for example, in the phase comparison stage of a television receiver.

For further improvement of the wave form, the output electrode 12 may be connected to a network which prefers the fundamental wave with respect to the harmonic. The network may comprise, for example, a strongly damped parallel resonant oscillatory circuit.

FIGURE 2 shows the circuit of a network with which an approximately cosinusoidal oscillation can be obtained from the fly-back pulse.

This figure shows in cross section the core 2 and the high voltage winding 8 shown in FIGURE 1, to which the output electrode 12 is connected. The winding 8 is in this case enveloped in known manner by a protective layer of polyester.

The electrode 12, consisting, for example, of a thin sheet of copper, may advantageously be connected to ground via a resistor 16 of, for example, 15K ohm. In addition, a network is connected to electrode 12 which consists of a capacitor 17 of, for example, 400 pf. in parallel with the series combination of a resistor 18 of, for example, 39K ohm, and an inductance 19 of, for example, 10 mh. By means of this network, an approximately cosinusoidal symmetric oscillation is produced from the sine half wave-shaped fly-back pulse superimposed by the interference oscillations with a recurrence frequency of the fly-back pulse of approximately 15 kc./s. and a fly-back period which is approximately 10% of the cycle. This pulse is shown in FIGURE 2 at the output terminal 20 of the network 17, 18, 19. The amplitude of the output oscillation may be varied in a simple manner by providing a parallel resistor 21.

The electrode 12, which may have a size of, for example, 15×20 mm., may be enclosed without difficulty in the polyester protective layer of the winding 8, in which case the line 13 is to be connected to an additional soldering tab 5 on the plate 4.

The network 16, 17, 18, 19 and 21 also may be connected, if desired, partially on the plate 4.

What is claimed is:

1. Apparatus for generating a signal for synchronizing the deflection signal of a television sweep system, comprising a deflection circuit for generating said deflection signal and including a transformer, said transformer comprising a primary winding and a high voltage secondary winding, said primary and secondary windings being inductively coupled together to such a degree as to provide a substantial leakage inductance between said windings, said primary winding having induced therein a flyback oscillation pulse comprising a fundamental frequency component and a harmonic frequency component, said harmonic component having a first given phase relationship relative to said fundamental frequency component, means including said leakage inductance for inducing a flyback oscillation pulse in said secondary winding comprising said fundamental frequency component and a harmonic component having a second different phase relationship relative to said fundamental frequency component whereby a relatively undistorted flyback oscillation pulse is derived therein, a phase comparison stage having input means, and capacitance means connected between said secondary winding and said phase comparison stage input means for coupling said relatively undistorted flyback oscillation pulse from said secondary winding to said phase comparison stage.

2. Apparatus as described in claim 1 further comprising a differentiation circuit coupled to said input means of said phase comparison stage for supplying a modified flyback oscillation pulse thereto.

3. A circuit for generating a signal for synchronizing the deflection signal of a television sweep system, comprising a deflection circuit for generating said deflection signal and including a transformer, said transformer comprising a primary winding and a high voltage secondary winding, means connecting said secondary winding to the anode of a high voltage rectifier, said primary and secondary windings being inductively coupled together to such a degree so as to provide a leakage inductance between said windings, said windings having induced therein a flyback oscillation pulse, a phase comparison stage having input means, capacitance means comprising first and second spaced conductors, said capacitance means being coupled to said high voltage secondary winding to derive therefrom a relatively undistorted flyback oscillation pulse and comprising an electrically conductive member arranged closely adjacent to said secondary winding so as to form said first conductor of said capacitance means, said secondary winding forming the second conductor of said capacitance means, and means connected to said electrically conductive member for coupling the flyback pulse derived in said secondary winding to said input means of said phase comparison stage.

4. Apparatus as described in claim 3 further comprising insulation means enclosing said electrically conductive member.

5. Apparatus as described in claim 3 further comprising a resistor connected to said electrically conductive member of said capacitance means to form a differentiation circuit with said capacitance means thereby to alter the waveshape of the flyback pulse coupled to said input means of said phase comparison stage.

6. Apparatus as described in claim 3 further comprising insulation means enveloping said secondary winding and wherein said electrically conductive member is embedded in said insulation envelope.

7. Apparatus as described in claim 3 wherein said flyback oscillation pulse comprises a wave having a fundamental frequency and a harmonic thereof, said apparatus further comprising a parallel resonant circuit tuned to said fundamental frequency of the flyback oscillation pulse and connected to said electrically conductive member.

8. Apparatus as described in claim 7 further comprising a resistor connected between said electrically conductive member and a point of reference potential, said resistor forming a differentiating network with said capacitance means, and means connecting said resonant circuit in parallel with said resistor.

9. In a television sweep system for providing beam deflection current and beam accelerating voltage to a cathode ray tube, a circuit for generating a signal for synchronizing said deflection current, comprising a phase comparison stage having input means, a deflection circuit for generating said deflection current and including a transformer, said transformer comprising a primary winding and a high voltage secondary winding, said primary and secondary windings being inductively coupled together to such a degree so as to provide a leakage inductance between said windings, said windings having induced therein a flyback oscillation pulse, an output conductor connected to said secondary winding for supplying said accelerating voltage to said cathode ray tube, capacitance mean for coupling the flyback oscillation pulse produced in said secondary winding to said input means of said phase comparison stage, said capacitance means comprising an electrical conductor arranged adjacent to said output conductor and extending parallel thereto, said electrical conductor supplying said flyback pulse as a synchronizing signal to said phase comparison stage.

10. Apparatus as described in claim 9 further comprising a differentiation circuit coupled to said electrical conductor so as to modify said flyback pulse and supply said modified flyback pulse as a synchronizing signal to said phase comparison stage.

11. A circuit for generating a signal for synchronizing the deflection signal of a television sweep system, comprising a deflection circuit for generating said deflection signal and including a transformer, said transformer comprising a primary winding and a high voltage secondary winding composed of a plurality of insulated conductors, said primary and secondary windings being inductively coupled together to such a degree so as to provide a leakage inductance between said windings, said windings having induced therein a flyback oscillation pulse, a phase comparison stage for providing a synchronizing signal to said deflection circuit, capacitance means coupled to said secondary winding for deriving therefrom a relatively undistorted flyback oscillation pulse, said capacitance means comprising a thin plate of electrically conductive material mounted adjacent the conductors of said secondary winding and forming therewith said capacitance means, and a differentiation circuit coupled between said conductive plate and said phase comparison stage for supplying a modified flyback pulse to said phase comparison stage.

12. A circuit for generating a signal for synchronizing the deflection signal of a television sweep system, comprising a deflection circuit for generating a deflection signal having a flyback period and including a transformer having stray capacitance, said transformer comprising a primary winding and a high voltage secondary winding mounted on a core of magnetic material and inductively coupled together so as to provide a predetermined leakage flux, said windings having induced therein a flyback oscillation pulse composed of a wave of a fundamental oscillation frequency and a wave which is approximately a harmonic of said fundamental frequency, said windings being arranged such that the leakage inductance produced by said leakage flux is of such a value as to provide a parallel resonant circuit with the stray capacitances in the transformer circuit, said resonant circuit being tuned to said fundamental and harmonic oscillation frequencies whereby the current across said leakage inductance and the derivative of this current at the beginning and at the end of the flyback period are substantially of zero value, a phase comparison stage for providing a synchronizing signal to said deflection circuit, capacitance means coupled to said secondary winding for deriving therefrom a relatively undistorted flyback oscillation pulse, said capacitance means comprising an electrically conductive member mounted adjacent said secondary winding and forming therewith said capacitance means, and a differentiation circuit coupled between said conductive member and said phase comparison stage for supplying a modified flyback pulse to said phase comparison stage.

References Cited by the Examiner

UNITED STATES PATENTS

| | | | |
|---|---|---|---|
| 2,281,661 | 5/1942 | Barton | 333—78 |
| 2,283,925 | 5/1942 | Harvey | 333—78 |
| 2,299,337 | 10/1942 | Mennerich et al. | 333—78 |
| 2,422,303 | 6/1947 | Jacob | 333—78 |
| 2,521,513 | 9/1950 | Gray | 333—78 |
| 2,553,324 | 5/1951 | Lord | 333—78 |
| 2,570,701 | 10/1951 | Martin | 333—78 |
| 2,661,399 | 12/1953 | Harvey | 333—78 |
| 2,800,608 | 7/1957 | Hazeltine | 315—27 |
| 2,810,093 | 10/1957 | Deal | 315—27 |
| 2,829,304 | 4/1958 | Massman | 315—27 |
| 2,907,825 | 10/1959 | Janssen | 315—27 |
| 3,051,888 | 8/1962 | Kroner | 315—27 |

DAVID G. REDINBAUGH, *Primary Examiner.*

HERMAN SAALBACH, *Examiner.*